United States Patent [19]

Teletzke

[11] Patent Number: 5,363,914
[45] Date of Patent: Nov. 15, 1994

[54] INJECTION PROCEDURE FOR GAS MOBILITY CONTROL AGENTS

[75] Inventor: Gary F. Teletzke, Sugar Land, Tex.

[73] Assignee: Exxon Production Research Company, Houston, Tex.

[21] Appl. No.: 37,980

[22] Filed: Mar. 25, 1993

[51] Int. Cl.$^5$ ............................................. E21B 43/22
[52] U.S. Cl. ....................................... 166/272; 166/273
[58] Field of Search ................. 166/268, 272, 273, 309

[56] References Cited

U.S. PATENT DOCUMENTS

| | | |
|---|---|---|
| 2,800,962 | 7/1957 | Garst . |
| 2,866,507 | 12/1958 | Bond et al. . |
| 3,100,524 | 8/1963 | Beeson . |
| 3,204,694 | 9/1965 | Johnson, Jr. et al. . |
| 3,292,702 | 12/1966 | Boberg . |
| 3,313,379 | 5/1967 | Road et al. . |
| 3,330,346 | 7/1967 | Jacobs et al. . |
| 3,342,256 | 9/1967 | Bernard et al. . |
| 3,344,857 | 10/1967 | Gilchrist . |
| 3,357,487 | 12/1967 | Gilchrist et al. . |
| 3,472,320 | 10/1969 | Dyes .................................. 166/273 |
| 3,491,832 | 1/1970 | Raza ................................... 166/269 |
| 3,491,834 | 1/1970 | Ahearn et al. ...................... 166/273 |
| 3,529,668 | 9/1970 | Bernard .............................. 166/273 |
| 3,547,199 | 12/1970 | Froning et al. ................... 166/305.1 |
| 3,548,941 | 12/1970 | Graham et al. ..................... 166/273 |
| 3,653,440 | 4/1972 | Reisberg ............................. 166/273 |
| 3,882,940 | 5/1975 | Carlin ................................. 166/273 |
| 4,074,759 | 2/1978 | Bousaid .............................. 166/273 |
| 4,099,569 | 7/1978 | Bousaid .............................. 166/273 |
| 4,100,966 | 7/1978 | Bousaid .............................. 166/273 |
| 4,113,011 | 9/1978 | Bernard et al. ..................... 166/273 |
| 4,230,182 | 10/1980 | Bousaid .............................. 166/273 |
| 4,266,611 | 5/1981 | Bousaid et al. ..................... 166/273 |
| 4,271,906 | 6/1981 | Bousaid et al. ..................... 166/273 |
| 4,287,950 | 9/1981 | Baker et al. ........................ 166/273 |
| 4,319,636 | 3/1982 | Kudchadker et al. ............... 166/274 |
| 4,597,442 | 7/1986 | Dilgren et al. ...................... 166/272 |
| 4,676,316 | 6/1987 | Mitchell ........................... 166/273 X |
| 4,703,797 | 11/1987 | Djabbarah .......................... 166/252 |
| 4,706,752 | 11/1987 | Holm ................................. 166/273 |
| 4,842,065 | 6/1989 | McClure ............................. 166/252 |
| 4,852,653 | 8/1989 | Borchardt .......................... 166/272 |
| 4,856,589 | 8/1989 | Kuhlman et al. ................... 166/273 |
| 5,027,898 | 7/1991 | Nase .................................. 166/272 |
| 5,046,560 | 9/1991 | Teletzke et al. .................... 166/272 |
| 5,060,727 | 10/1991 | Schramm et al. .................. 166/252 |
| 5,234,054 | 8/1993 | Chou ............................. 166/273 X |

FOREIGN PATENT DOCUMENTS

| | | |
|---|---|---|
| 1221305 | 5/1987 | Canada . |
| 2245622 | 1/1992 | United Kingdom . |

OTHER PUBLICATIONS

S. S. Marsden, "Foams in Porous Media, Supri TR-49", United States Department of Energy, Work by Exxon Production Research Company under Contract No. DE-AC03-81SF11564, Date Published May 1986.

Primary Examiner—George A. Suchfield
Attorney, Agent, or Firm—Pamela L. Wilson

[57] ABSTRACT

This invention relates to an improved method for recovering oil from a subterranean formation comprising sequentially injecting into the formation through an injection well in communication therewith: (a) a slug of an aqueous solution containing a high concentration of a gas mobility control agent; (b) a slug of an aqueous solution containing a low concentration of said gas mobility control agent; and (c) gas as the primary oil displacing fluid selected from the group consisting of carbon dioxide, hydrocarbon gas, inert gas and steam whereby said gas and said slugs of aqueous solution containing the gas mobility control agent form a mixture in the formation that significantly reduces gas mobility in the more permeable regions of the formation.

12 Claims, 4 Drawing Sheets

INJECTION PROCEDURE FOR GAS MOBILITY CONTROL AGENTS

FIELD OF THE INVENTION

This invention relates to recovering oil from a subterranean oil-bearing formation by injecting into the formation water-soluble gas mobility control agents according to a particular injection scheme that greatly reduces the amount of mobility control agent required and accelerates the recovery of oil.

BACKGROUND OF THE INVENTION

A significant fraction of the oil-in-place is left in the ground after primary or secondary recovery. Gas injection, sometimes referred to as gas flooding, has been used to recover this remaining oil. The terms "gas injection" and "gas flooding" as used herein will mean an oil recovery process in which the fluid injected is a hydrocarbon gas, inert gas, carbon dioxide or steam.

The success of gas floods has been diminished by the unfavorable mobility and density ratios between the gas and reservoir fluids. The viscosities of gases are often 10 to 100 times less than oil and water viscosities. At these unfavorable ratios, gases finger and channel through the formation, leaving parts of the reservoir unswept. Added to this fingering is the inherent tendency of a highly mobile gas to flow preferentially through the more permeable rock sections or to gravity override in the reservoir. These basic factors—permeability variations and unfavorable mobility and density ratios—greatly reduce the effectiveness of gas floods and may make them uneconomic. One apparent remedy is to control the mobility of the injected gas.

It has been suggested that the mobility of the gas may be reduced by injecting into a formation or forming in situ a mixture of a gas and an aqueous surfactant solution. Such mixtures are commonly referred to as foams. Since the effective viscosity of foam is greater than the viscosities of its components, it has been suggested that such mixtures of gas and aqueous surfactant solution will help improve the sweep efficiency of gas drives.

Foam is a dispersion of a large volume of gas in a relatively small volume of liquid. It should be noted, however, that at reservoir conditions several gases, including $CO_2$, exist as a dense fluid, resembling a liquid more than a gas. For this reason, the term "solvent" is sometimes used to describe the "gas" and the term "emulsion" is sometimes used to describe the solvent-water mixture.

The choice of surfactant for use as a mobility control agent is crucial. Ideally, the surfactant should reduce gas mobility enough to adequately improve sweep efficiency, but not so much as to impair gas injectivity and thus significantly delay oil recovery. Furthermore, surfactant retention should be as low as possible to help minimize the amount of surfactant required.

The method used to inject the surfactant solution and gas is also crucial. The surfactant solution should be delivered to regions of the reservoir where it is needed and in such a way that the necessary interaction with the gas occurs to reduce gas mobility. Injection of excessive amounts of surfactant, or injection of surfactant into regions of the reservoir where gas mobility reduction is not desired will have an adverse impact on the economic feasibility of the process.

There is substantial uncertainty about the most effective method for implementing a foam mobility control process. Numerous procedures for injecting water-soluble gas mobility control agents have been proposed, but there is little consensus about the most effective injection procedure.

U.S. Pat. No. 2,866,507 describes a foam flooding process in which an aqueous solution of the foaming agent is introduced into the formation immediately prior to gas injection.

U.S. Pat. No. 3,185,634 describes a foam flooding process in which a stable foam is pregenerated prior to injection into the formation.

U.S. Pat. No. 3,318,379 discloses a foam drive process in which injection of surfactant is followed by injection of a nongaseous, surfactant-free liquid, which is followed in turn by injection of gas to form a foam. The nongaseous fluid, which may be water, is injected to displace surfactant away from the vicinity of the well and prevent loss of injectivity caused by foam formation near the well. These steps may be repeated.

U.S. Pat. No. 3,491,832 discloses a foam plugging process in which small alternate batches of surfactant solution and gas are injected. A batch of spacer liquid, such as water, may be used between the surfactant and gas to avoid excessive plugging of the formation near the well.

U.S. Pat. No. 3,653,440 discloses a method for reducing the mobility of an aqueous surfactant solution. This surfactant flooding process consists of injection of a slug of "active" surfactant, followed by alternate slugs of gas and an aqueous drive liquid. The "active" surfactant is capable of reducing oil/water interfacial tension to less than 0.01 dyne/cm, and thus is the primary oil displacement fluid. The aqueous drive liquid preferably contains a lower, inactive, concentration of surfactant. The gas and aqueous drive liquid are injected in rates and amounts that cause the gas to move ahead of the liquid that is injected and displaced within the formation. The mobility control is not dependent on the formation of a foam; although it is not adversely affected by the formation of a foam.

U.S. Pat. No. 4,856,589 describes a foam drive process in which the surfactant is injected as a dilute aqueous solution in which the surfactant is present at a concentration below its critical micelle concentration (CMC). It is stated that the method is particularly useful in a WAG operation, where multiple injections of dilute surfactant solution are alternated with injections of gas. In another mode, a conventional surfactant preslug, containing surfactant at a concentration above its CMC, is injected first. This preslug is followed by injection of a gas, then injection of a second, dilute surfactant solution containing surfactant at a concentration below its CMC, and then by injection of more gas. Injection of the gas and dilute surfactant solution may then be repeated.

The conventional injection procedures most commonly used in the limited field testing reported to date include adding surfactant to the water at a constant concentration in Water-Alternating-Gas (WAG) or Water-Simultaneous-Gas (WSG) injection to generate foam in situ, or injecting preformed foam. The preferred approach has been to coinject surfactant solution and gas or to use small alternating banks that simulate coinjection. Low surfactant concentrations, on the order of 0.1%, are commonly advocated. Even when surfactant retention is low, the amount of enhanced oil recovery obtained by using these conventional injection procedures may not be sufficient to justify the cost of the surfactant injected. Thus, there continues to be a significant need for improved injection procedures to effectively place the surfactant in the reservoir so as to minimize the amount of surfactant required.

SUMMARY OF THE INVENTION

The present invention relates to an improved method for recovering oil from a subterranean formation comprising sequentially injecting into the formation through an injection well in communication therewith: (a) a slug of an aqueous solution containing a high concentration of a gas mobility control agent; (b) a slug of an aqueous solution containing a low concentration of said gas mobility control agent; and (c) gas as the primary oil displacing fluid selected from the group consisting of carbon dioxide, hydrocarbon gas, inert gas and steam whereby said gas and said slugs of aqueous solution containing the gas mobility control agent form a mixture in the formation that significantly reduces gas mobility in the more permeable regions of the formation. The high-concentration slug contains sufficient gas mobility control agent to satisfy retention of said agent within pore spaces contacted by said solution. The volume of the low concentration slug is at least sufficient to fill the pore volume occupied by the aqueous solution remaining after step (c) in the regions of the reservoir within which placement of said mixture is desired. It is preferred that the total quantity of said gas mobility control agent injected in steps (a) and (b) is sufficient to displace the resident water from the regions of the reservoir within which placement of the gas-mobility-reducing mixture is desired.

In a preferred embodiment, the concentration of gas mobility control agent in said high concentration slug is from about 0.25 to about 2.0 weight percent, the concentration of gas mobility control agent in said low concentration slug is from about 0.01 to about 0.25 weight percent and the volume of the high-concentration slug is less than the volume of the low-concentration slug. In a more preferred embodiment, the concentration of gas mobility control agent in said high concentration slug is from about 0.5 to about 1.0 weight percent, the concentration of gas mobility control agent in said low concentration slug is from about 0.05 to about 0.1 weight percent and the volume of the high-concentration slug is between 10 and 50 percent of the volume of the low-concentration slug.

BRIEF DESCRIPTION OF THE DRAWINGS

FIG. 2A shows overall mobility history; FIGS. 2B, C and D show mobility at 2 in., 6 in., and 10 in. from the core inlet, respectively.

FIG. 4A shows overall mobility history; FIGS. 4B, C, and D show mobility at 2 in., 6 in., and 10 in. from the core inlet, respectively.

FIG. 6A shows overall mobility history; FIGS. 6B, C, and D show mobility at 2 in., 6 in., and 10 in. from the core inlet, respectively.

FIG. 7A–8D is a plot of the volume fraction of $CO_2$ and oil in the produced fluids and of the surfactant concentration in the produced aqueous phase, normalized to 0.25, for a two-step surfactant preinjection.

FIG. 8A–8D display the mobilities determined at various points along the core.

FIG. 8A shows over mobility history; FIGS. 8B, C, and D show mobility at 2 in., 6 in., and 10 in. from the core inlet, respectively.

DETAILED DESCRIPTION OF INVENTION

Figure 1:
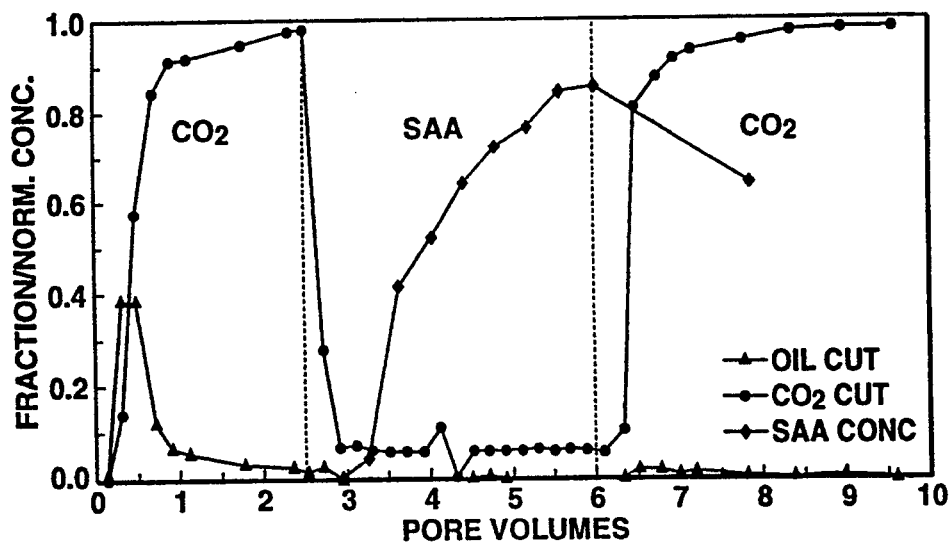
FIG. 1 is a plot of the volume fraction of $CO_2$ and oil in the produced fluids and of the surfactant concentration in the produced aqueous phase, normalized to the constant injected concentration of 0.25%.
Figure 2A:
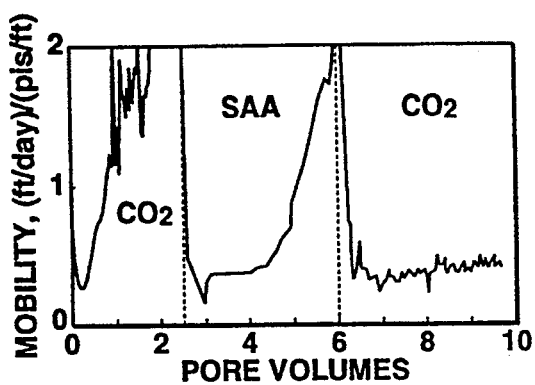
FIG. 2A–2D display the mobilities determined at various points along the core.
Figure 2B:
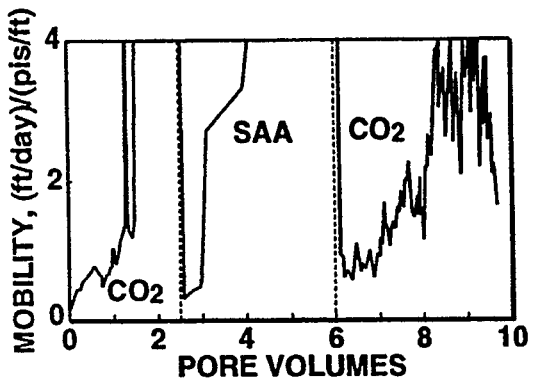
Figure 2C:
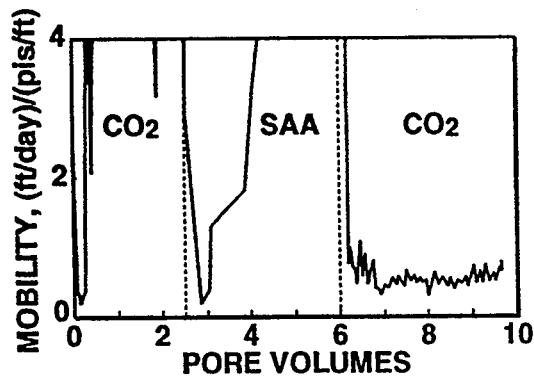
Figure 2D:
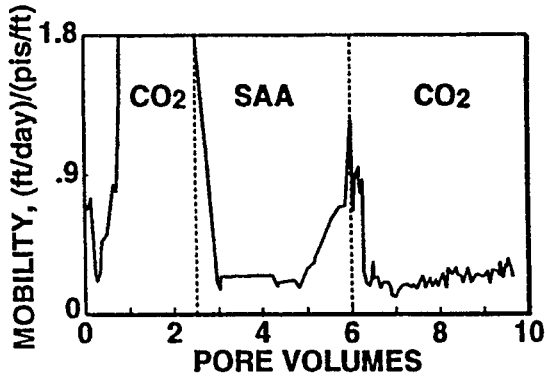

This invention comprises a new injection scheme that greatly reduces the amount of surfactant required and accelerates the recovery of oil in a surfactant-aided gas mobility control process. The term "gas mobility control agent" is used in describing the present invention to emphasize that, although the agent is a surfactant, its function is to reduce gas mobility rather than reduce interfacial tension between the oil and water to enhance oil recovery. This distinction impacts not only choice of surfactant, but the design of the flood as further described below. The new injection scheme consists of three steps: (a) preinjection of a slug having a high-concentration (presumably 0.25–2.0 wt %) of a gas mobility control agent, followed immediately by (b) injection of a slug having a low-concentration (presumably 0.01–0.25 wt %) of a gas mobility control agent, and finally (c) injection of a gas as the primary oil displacing fluid. The high-concentration slug contains sufficient gas mobility control agent to satisfy its retention within the pore space contacted by the injected aqueous solution. The concentration of the low concentration slug should exceed that needed to promote and maintain an effective gas-mobility-reducing mixture. The volume of the low concentration slug should be at least sufficient to fill the pore volume occupied by the aqueous phase remaining after gas injection, step (c), in the regions of the reservoir within which placement of the mixture is desired. It is preferred that the total quantity of said gas mobility control agent injected in steps (a) and (b) is sufficient to displace the resident water from the regions of the reservoir within which placement of the gas-mobility-reducing mixture is desired during step (c) and thus substantially prevent gas from moving ahead of the gas mobility control agent.

Injection of the gas mobility control agent may commence after some portion of a gas flood has been completed. In this case, there would be a period of conventional WAG injection before the injection scheme of this invention is applied. Alternatively, the gas mobility control agent may be added to the water during the last stage of a waterflood operation.

Injection of the slug having a low-concentration of gas mobility control agent may be followed by injection of a small water bank to displace the gas mobility control agent away from the vicinity of the wellbore and thus avoid excessive plugging of the formation near the wellbore. The gas may be alternated with small slugs of a gas mobility control agent solution or water if necessary to maintain the mixture and displace it away from the wellbore. The water-to-gas ratio may be tapered from a high value to a lower value during gas injection. However, it is generally most advantageous to preinject most, if not all, of the gas mobility control agent, and to keep the amount of gas mobility control agent injected during gas injection as low as possible. As explained below, the process will be most effective if the slugs of gas mobility control agent and gas are sized so as to prevent the gas from outrunning the gas mobility control agent.

There are two essential differences between this injection scheme and those contemplated by the prior art. First, the preinjection of gas mobility control agent is divided into two sequential steps; injection of a high concentration solution followed immediately by a low concentration solution. Second, the quantity of the gas mobility control agent preinjected is sufficient to substantially forestall the gas from moving ahead of the gas mobility control agent.

In general, the gaseous fluids used in this invention can comprise steam, carbon dioxide, inert gases such as air and nitrogen, and hydrocarbons such as methane, ethane, propane, and natural gas. The gaseous fluids may be used in pure form, or as mixtures with each other, or as mixtures with other gases, such as hydrogen sulfide.

The gas mobility control agent used in this invention must reduce gas mobility sufficiently at representative reservoir flow rates and across a wide range of water saturation, preferentially providing long-lasting mobility reduction even at connate water saturation. Of course, as noted above, it is also desirable that retention of the gas mobility control agent be as low as possible. The optimum surfactant used as the gas mobility control agent for a given application will depend on reservoir conditions such as temperature, salinity, gas composition, oil composition and permeability. Acceptable surfactants can be identified using laboratory coreflood testing procedures known to those skilled in the art. Nonlimiting examples of classes of surfactants that may be used in this process as gas mobility control agents are described in U.S. Pat. No. 4,086,964, 4,113,011, 4,380,266, 4,393,937, 4,502,538, 4,682,653, 4,693,311, 4,763,730, 4,828,032, 4,856,588, and 5,046,560. The surfactants described in U.S. Pat. No. 4,113,011, 4,380,266, 4,502,538, 4,763,730, 4,828,032, 4,856,588, and 5,046,560 are believed to be particularly effective for controlling gas mobility in $CO_2$ or hydrocarbon gas flooding. The surfactants described in U.S. Pat. No. 4,086,964, 4,393,937, 4,682,653 and 4,693,311 are believed to be particularly effective for controlling steam mobility.

Other water-soluble additives, such as cosurfactants or polymers, may be added to the gas mobility control solution if necessary to promote and maintain an adequate level of gas mobility reduction. Sacrificial adsorbents may be added to enhance the rate of propagation of the gas mobility control agent into the reservoir. In one version of the proposed injection scheme, a sacrificial adsorbent is added to the first, high-concentration slug, and a cosurfactant or polymer is added to the second, low-concentration slug. The possible preferential retention of such additives needs to be considered when determining the optimal sizes of the gas mobility control slugs.

The composition of the gas mobility control agent may also be changed between the two slugs. In one embodiment of the present invention that is particularly useful in high-temperature or low-pH reservoirs, the first high-concentration slug contains an alkyl ethoxy sulfate surfactant and the second, low-concentration slug contains an alkyl ethoxy sulfonate surfactant. The two surfactants preferentially have similar gas-mobility-control and surfactant-retention behavior. The ethoxy sulfate, which can cost less than half as much as an ethoxy sulfonate, serves as an inexpensive sacrificial adsorbent for the sulfonate, which provides long-lasting gas mobility control. As is known to those skilled in the art, sulfonates are generally preferred for use at high temperature or low pH, because at those conditions ethoxy sulfates can decompose rapidly compared to the time scale over which gas mobility needs to be controlled. By reducing the amount of relatively expensive sulfonate that needs to be used, this embodiment of the present invention can substantially reduce the overall cost of the gas-mobility-control agent.

The advantages of the new injection scheme can be understood by considering the surfactant loss mechanisms in foam flooding processes. On the basis of laboratory coreflood tests, four such loss mechanisms have been identified: (1) adsorption on the rock, (2) adsorption at the oil-water interface, (3) trapping of surfactant in a residual aqueous phase, and (4) retention in newly formed foam lamellae.

An analysis of surfactant propagation in a linear flood, such as a coreflood experiment, illustrates the impact of these loss mechanisms on surfactant and foam propagation and suggests the optimal injection procedure. A material balance on surfactant indicates that the minimum surfactant slug size needed to promote the formation of foam throughout the entire length of a core can be estimated from:

$$Q_{min} = S_{wa} + C_r/C_i \tag{1}$$

where dispersion has been neglected so that the surfactant front propagates as a step change in concentration from zero to the injected concentration, and it has been assumed that foam forms wherever there is surfactant. Here $Q_{min}$ is the minimum slug size, $S_{wa}$ is the average water saturation in the core at foam breakthrough, $C_r$ is the surfactant retention (wt/pore-vol.) on the rock, at the oil-water interface, and in foam lamellae, and $C_i$ is the injected surfactant concentration (wt/vol.). The units of $Q_{min}$ are fractional pore volume.

The minimum amount of surfactant required is:

$$M_{min} = C_i S_{wa} + C_r \tag{2}$$

The units of $M_{min}$ are weight/pore-volume.

The amount of surfactant retained in foam lamellae can far exceed that adsorbed at the rock-fluid and oil-water interfaces. This can substantially retard surfactant propagation when low surfactant concentrations are used in the conventional injection procedures of adding surfactant to the water phase in WAG or WSG injection or injecting preformed foam. In such injection schemes, the high-mobility gas tends to outrun the surfactant solution. The propagation of the surfactant front is thus delayed by all three adsorption mechanisms. The delay in propagation of the surfactant front caused by retention in foam lamellae can be minimized by preinjecting the surfactant to prevent gas from outrunning surfactant. Then, only retention on the rock and at the oil-water interface delays propagation of the surfactant front. In essence, the surfactant solution already in the pore space is used to generate foam lamellae, leading to better utilization of the surfactant. However, a disadvantage of surfactant preinjection is that oil recovery does not start until after gas injection begins, and thus is delayed by the initial surfactant injection.

Therefore, it is desirable to minimize both the volume of surfactant solution, $Q_{min}$, and the quantity of surfactant, $M_{min}$, required when preinjecting surfactant. Minimizing $M_{min}$ minimizes surfactant cost, and minimizing $Q_{min}$ reduces the delay in oil production. Examination of Eqns. (1) and (2) shows that there is a trade-off between $Q_{min}$ and $M_{min}$ when injecting at constant surfactant concentration. Injection at high surfactant concentration minimizes $Q_{min}$, but injection at low surfactant concentration minimizes $M_{min}$.

The present invention minimizes $Q_{min}$ and $M_{min}$ simultaneously. The first surfactant bank contains a high surfactant concentration, $C_1$, and the second surfactant bank contains a lower surfactant concentration, $C_2$. The volume, $Q_1$, of the high concentration bank is at least sufficient to satisfy surfactant retention (i.e., $Q_1 > C_r/C_1$ for a linear coreflood), and the volume, $Q_2$, of the low concentration bank is sufficient to fill the pore volume occupied by the injected surfactant solution after gas injection in the regions of the reservoir where foam forms (i.e., $Q_2 > S_{wa}$ for a linear coreflood). $C_1$ should generally be chosen so that $Q_1$ is large enough to prevent degradation of the high concentration bank by dispersive mixing. $C_2$ should be greater than the minimum surfactant concentration required for effective gas mobility reduction.

The process of this invention will generally be applied to a subterranean, oil-containing formation penetrated by at least one injection well and at least one spaced-apart production well. The injection well is perforated or other fluid flow communication is established between the well and the formation. The production well is completed in fluid communication with a substantial portion of the vertical thickness of the formation. While recovery of the type contemplated by this invention may be carried out with only two wells, this invention is not limited to any particular number of wells. The invention may be practiced using a variety of well patterns as is well known in the art of oil recovery, such as a repeated five-spot pattern in which each injection well is surrounded by four production wells, or in a line-drive arrangement in which a series of aligned injection wells and a series of aligned production wells are utilized. As known to those skilled in the art, the total volume of aqueous solution and gas, and their ratio, required in the practice of this invention will be different for different reservoirs and well patterns. The principles outlined above for a linear flood can be used to determine the optimal slug sizes and surfactant concentrations in other types of floods.

In addition to minimizing the amount of surfactant and the volume of surfactant solution that must be injected, the new injection procedure improves injectivity relative to methods approaching coinjection of surfactant solution and gas. These methods include WSG injection, injection of small alternating banks, or injection of preformed foam. Coinjection can create a strong foam in the near-well region that reduces injectivity, requiring an increase in injection pressure to maintain the same injection rate. In most reservoirs, injection wells are already operated near the maximum operating pressure. This means that injection rates must be lowered to prevent fracturing the injection wells, slowing down the foam flooding process, which has a negative economic impact. Injecting surfactant solution and gas sequentially guarantees that each fluid is injected at its maximum possible rate. This means that a given amount of gas can be injected in a shorter period of time, leading to faster oil recovery.

Furthermore, this injection procedure also results in more effective placement of the surfactant solution compared to conventional injection procedures. Even when gas mobility is reduced, the density difference between gas and the reservoir fluids remains, as does the tendency for gas to override. In methods approaching coinjection of gas and surfactant solution, the gas still gravity segregates to the top of the reservoir and outruns surfactant solution, which segregates to the bottom of the reservoir because it is completely miscible with the resident brine. Therefore, an override zone forms where only gas is flowing; the surfactant solution never displaces the resident water in this zone. As a result, foam does not form in the override zone, and gas sweep is not improved. In contrast, when preinjected as proposed here, the surfactant solution displaces brine away from the injection well in a uniform manner, resulting in placement of the surfactant solution at the top of the reservoir, where it is needed, before the gas override zone forms. Therefore, foam does form in the override zone and gas sweep is improved.

Experimental Results

The advantages of this invention are further illustrated by a series of $CO_2$ coreflood experiments. The experiments were conducted in $12'' \times 1'' \times 1''$ mixed-wet San Andres carbonate cores at 100 F and 2000 psi. The nominal permeability of the cores was 200 millidarcies. First, a waterflood residual oil saturation of a 6 centipoise crude oil was established, then $CO_2$ was injected to establish a miscible flood residual oil saturation of approximately 15 to 20% pore volume and provide a baseline $CO_2$ mobility. Next, foam was generated by injection of surfactant, followed by $CO_2$, at a rate of 1 ft/day. The surfactant was $iC_{13}H_{27}(OCH_2CH_2)_8OSO_3Na$. Mobilities were determined by monitoring pressures between taps 1'' apart centered 2'', 6'', and 10'' from the core inlet. Overall mobilities were also determined by monitoring pressures between the two taps 1.5'' from each end of the core. The surfactant injection procedure used in each flood is summarized in the Table 1.

TABLE 1

| Test No. | Figure Numbers | Preinjected Bank Sizes and Surfactant Conc. | Injection Factor, Bank Size (% PV) × Surf. Conc. (Wt %) |
|---|---|---|---|
| 1 | 1-2 | 3.5 PV 0.25% | 87.5 |
| 2 | 3-4 | 0.3 PV 2.0% | 60.0 |
| 3 | 5-6 | 0.2 PV 2.0% 0.3 PV 0.25% | 47.5 |
| 4 | 7-8 | 0.15 PV 2% 0.15 PV 0.25% | 33.8 |

The amount of surfactant injected in these tests is characterized by the injection factor, defined as the product of the injected surfactant concentration and the surfactant bank size. The injection factors for each test are recorded in the last column of Table 1. In tests where multiple surfactant banks were injected, the injection factors for the individual banks were summed to obtain the total injection factor.

In Test 1, a large, low-concentration surfactant bank, denoted "SAA" in FIGS. 1 and 2, was injected. As shown in FIG. 1, surfactant broke through after about 1 pore volume (PV) of surfactant injection, and the produced surfactant concentration reached only about 80% of its injected value after 3.5 PV surfactant injection. After surfactant injection, $CO_2$ mobility was reduced throughout the core (FIG. 2).

Figure 3:
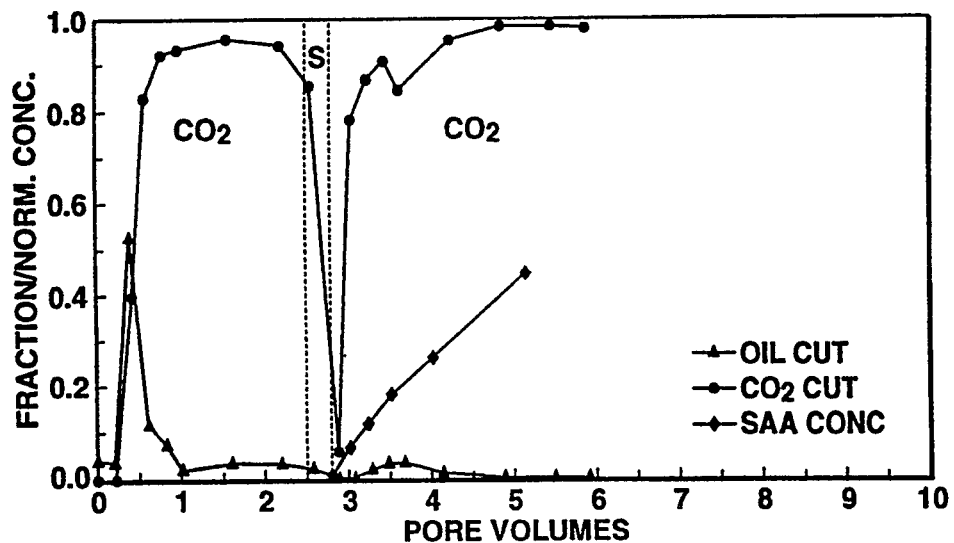
FIG. 3 is a plot of the volume fraction of $CO_2$ and oil in the produced fluids and of the surfactant concentration in the produced aqueous phase, normalized to the constant injected concentration of 2.0%.
Figure 4A:
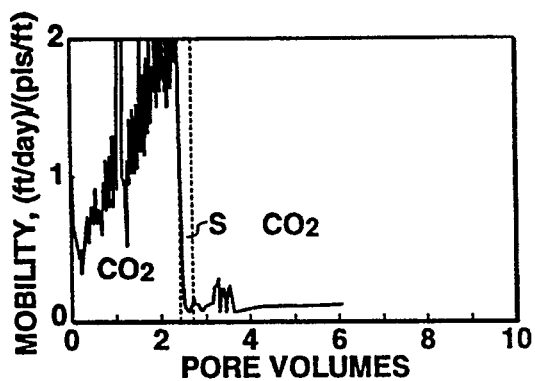
FIG. 4A–4D display the mobilities determined at various points along the core.
Figure 4B:
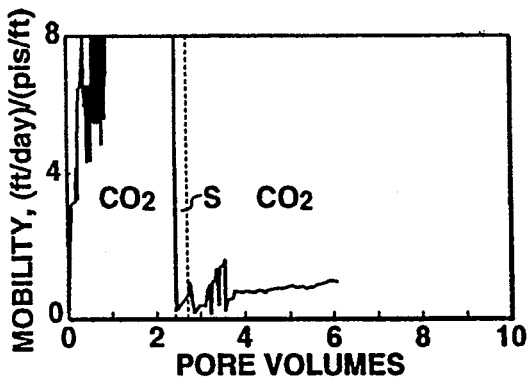
Figure 4C:
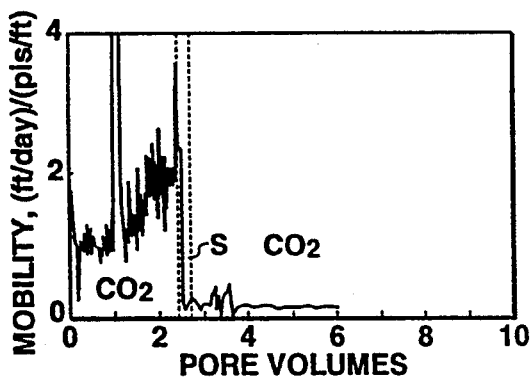
Figure 4D:
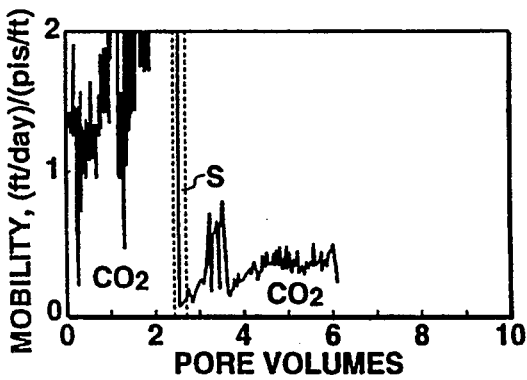

Surfactant propagation was better in Test 2, in which a small, high concentration surfactant bank, denoted "S" in FIGS. 3 and 4, was injected. As shown in FIG. 3, a produced surfactant concentration of 0.2% was attained after injection of only 0.7 PV. As in test 1, $CO_2$ mobility was reduced throughout the core (FIG. 4). Compared to test 1, both a smaller volume of surfactant solution and a smaller quantity of surfactant were used to propagate an effective surfactant concentration the entire core length.

Figure 5:
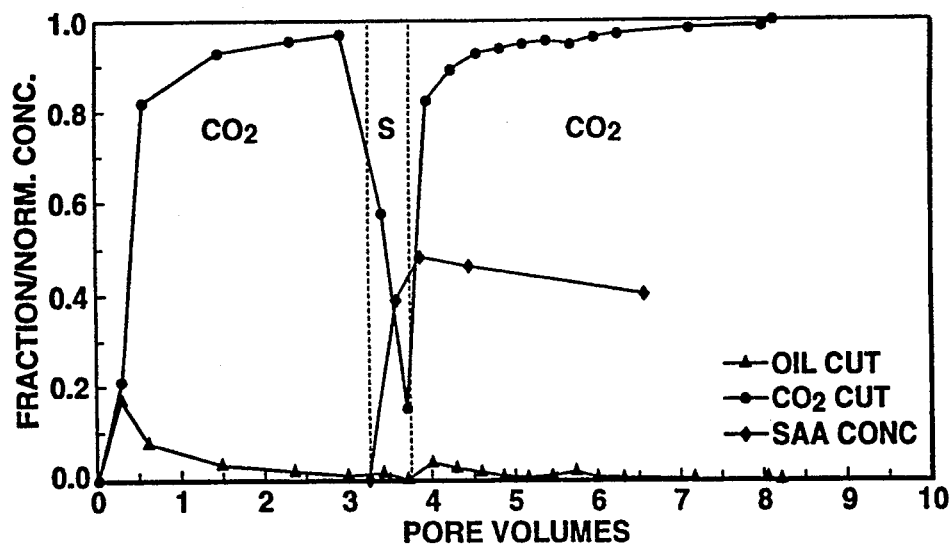
FIG. 5 is a plot of the volume fraction of $CO_2$ and oil in the produced fluids and of the absolute surfactant concentration in the produced aqueous phase for a two-step surfactant preinjection.
Figure 6A:
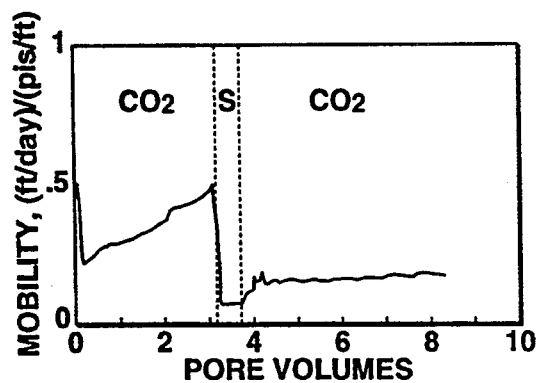
FIG. 6A–6D display the mobilities determined at various points along the core.
Figure 6B:
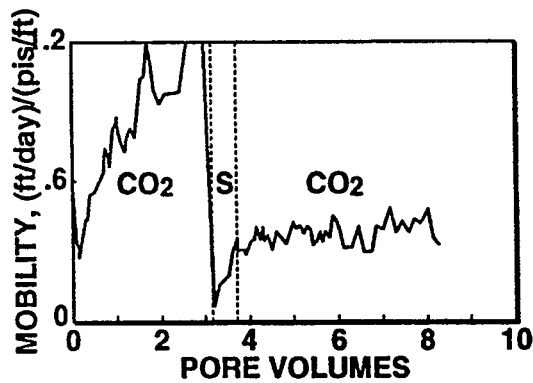
Figure 6C:
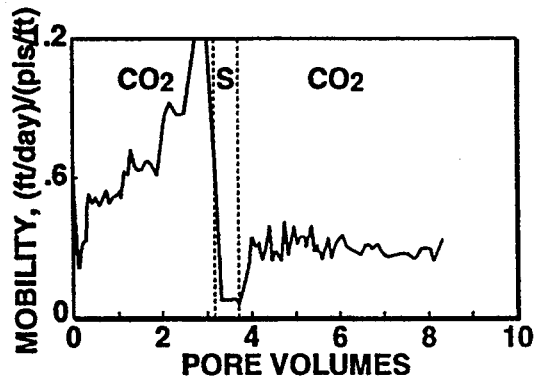
Figure 6D:
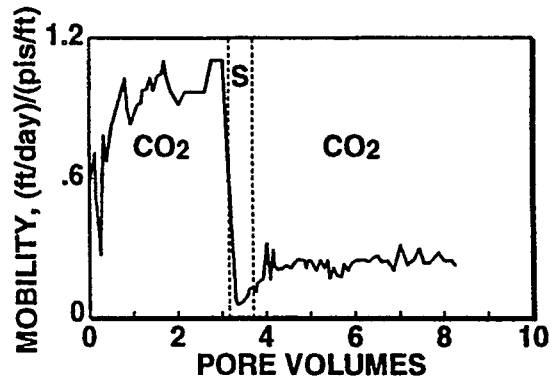

The quantity of surfactant was reduced further in Test 3, in which the injection procedure of the present invention was used (FIGS. 5 and 6). The 0.5 PV surfactant injection step, denoted "S" in FIGS. 5 and 6, consisted of injection of a 0.2 PV bank of 2% surfactant solution, followed by a 0.3 PV bank of 0.25% surfactant solution. Surfactant broke through before $CO_2$, indicating that the amount of surfactant injected could be reduced even further. As in the previous tests using constant surfactant concentration, $CO_2$ mobility was reduced throughout the core.

Figure 7:
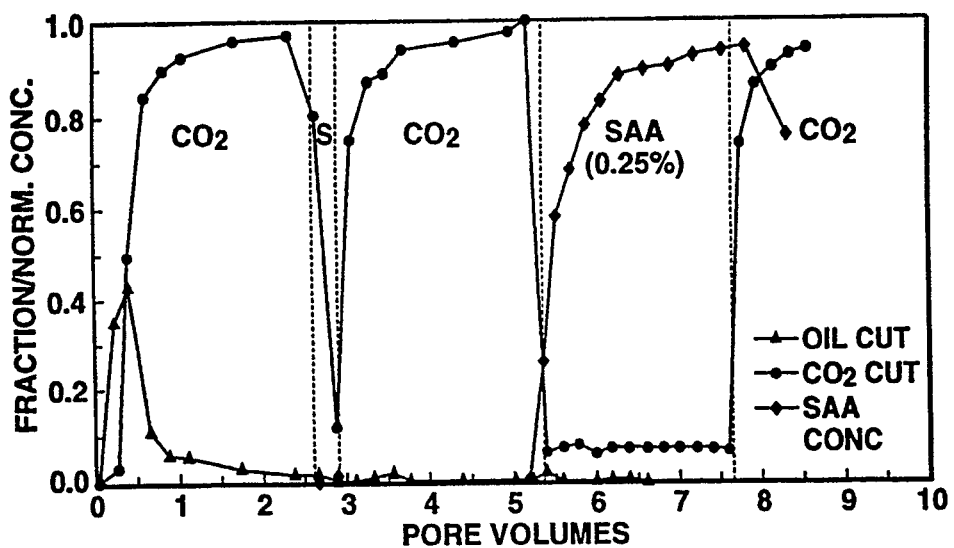
Figure 8A:
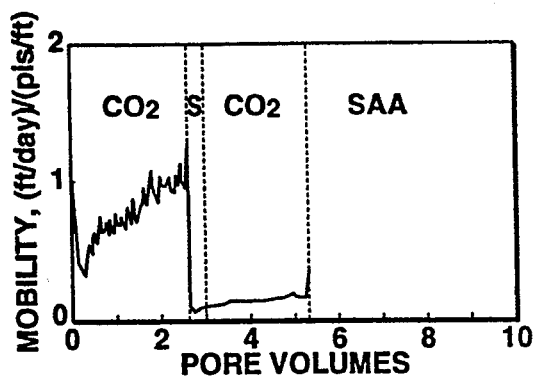
Figure 8B:
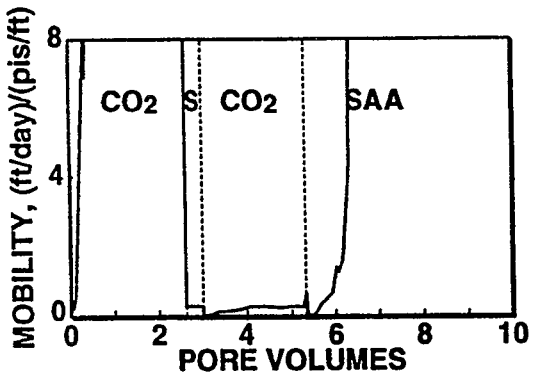
Figure 8C:
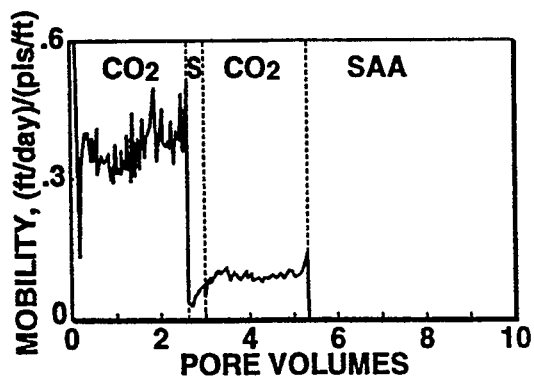
Figure 8D:
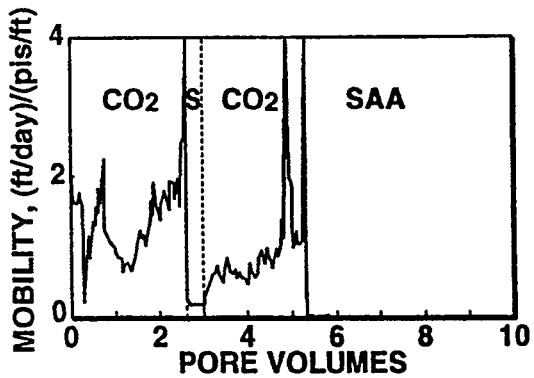

However, preinjection of an even smaller quantity of surfactant in Test 4 (FIGS. 7 and 8) failed to propagate surfactant the entire core length. In this test, the 0.3 PV surfactant injection step, denoted "S" in FIGS. 7 and 8, consisted of injection of a 0.15 PV bank of 2% surfactant solution, followed by injection of a 0.15 PV bank of 0.25% surfactant solution. Once again, $CO_2$ mobility was reduced throughout the core. Surfactant broke through rapidly upon injection of a second low-concentration surfactant bank following the $CO_2$ bank, indicating that the amount of surfactant initially injected was nearly sufficient. Thus, in these tests, the minimum injection factor needed to propagate surfactant the entire core length when using the present invention was about 40, about half the value needed when surfactant was injected at constant concentration.

In summary, these tests have demonstrated that both the volume of surfactant and the total amount of surfactant preinjected can be substantially reduced by using the proposed injection scheme. Specifically, to propagate a surfactant concentration of at least 0.25% the entire core length, the volume of surfactant solution preinjected was reduced by a factor of seven, and the amount of surfactant preinjected was reduced by a factor of two, compared to preinjection at a constant, low concentration.

We claim:

1. A method for recovering oil from a subterranean oil-containing formation comprising sequentially injecting into the formation through an injection well in communication therewith;
   a) a slug of an aqueous solution containing a high concentration of a gas mobility control agent wherein said slug is of sufficient size to satisfy retention of the agent within pore spaces contacted by said high concentration solution;
   b) a slug of an aqueous solution containing a low concentration of said gas mobility control agent; and
   c) gas as the primary oil displacing fluid selected from the group consisting of carbon dioxide, hydrocarbon gas, inert gas and steam whereby said gas and said slugs of aqueous solution containing the gas mobility control agent form a mixture in the formation that significantly reduces gas mobility in more permeable regions of the formation; and recovering oil at a spaced apart producing well.

2. A method in accordance with claim 1 wherein the volume of said low concentration slug is at least sufficient to fill the pore volume occupied by said aqueous solution remaining after said gas injection in the regions of the reservoir within which placement of said mixture is desired.

3. A method in accordance with claim 1 wherein the concentration of said high concentration gas mobility control agent solution is from about 0.25 to about 2.0 weight percent mobility control agent, and the concentration of said low concentration gas mobility control solution is from about 0.01 to about 0.25 weight percent mobility control agent.

4. A method in accordance with claim 1 wherein the concentration of said high concentration gas mobility control agent solution is from about 0.5 to about 1.0 weight percent mobility control agent and the concentration of said low concentration gas mobility control solution is from about 0.05 to about 0.1 weight percent mobility control agent.

5. A method in accordance with claim 1 wherein the total quantity of gas mobility control agent preinjected in steps (a) and (b) is sufficient to displace resident water from regions of the reservoir within which placement of the gas-mobility-reducing mixture is desired.

6. A method in accordance with claim 1 wherein the volume of said high-concentration slug is less than the volume of said low-concentration slug.

7. A method in accordance with claim 6 wherein the volume of said high-concentration slug is between 10 and 50 percent of the volume of said low-concentration slug.

8. A method in accordance with claim 1 wherein a sacrificial adsorbent is added to the first, high-concentration slug.

9. A method in accordance with claim 1 wherein a cosurfactant or polymer is added to the second, low-concentration slug.

10. A method in accordance with claim 1 wherein a slug of water is injected after said slug of aqueous solution containing a low concentration of gas mobility control agent.

11. A method in accordance with claim 1 wherein injection of said gas is alternated with injection of aqueous solution containing a low concentration of gas mobility control agent.

12. A method in accordance with claim 1 wherein said high-concentration slug contains an alkyl ethoxy sulfate surfactant and said low-concentration slug contains an alkyl ethoxy sulfonate surfactant.

* * * * *